(12) United States Patent
He et al.

(10) Patent No.: US 11,012,197 B2
(45) Date of Patent: May 18, 2021

(54) RESOURCE SET CONFIGURATIONS USING AUTOMATIC REPEAT REQUEST INFORMATION

(71) Applicant: Apple Inc., Cupertino, CA (US)

(72) Inventors: Hong He, Sunnyvale, CA (US); Gang Xiong, Portland, OR (US); Debdeep Chatterjee, San Jose, CA (US); Joonyoung Cho, Portland, OR (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/245,552

(22) Filed: Jan. 11, 2019

(65) Prior Publication Data

US 2019/0149275 A1    May 16, 2019

Related U.S. Application Data

(60) Provisional application No. 62/616,752, filed on Jan. 12, 2018.

(51) Int. Cl.
*H04L 1/18* (2006.01)
*H04W 24/08* (2009.01)
(Continued)

(52) U.S. Cl.
CPC .......... *H04L 1/1819* (2013.01); *H04L 1/0061* (2013.01); *H04L 5/001* (2013.01); *H04L 5/0055* (2013.01); *H04L 5/0064* (2013.01); *H04L 5/0094* (2013.01); *H04L 65/1016* (2013.01); *H04L 65/1063* (2013.01); *H04L 65/80* (2013.01); *H04W 24/08* (2013.01);
(Continued)

(58) Field of Classification Search
CPC ..... H04L 1/1819; H04L 1/0061; H04L 5/001; H04L 5/0055; H04L 5/0064; H04L 5/0094; H04L 65/1016; H04L 65/1063; H04L 65/80; H04L 1/1614; H04L 5/0023; H04W 24/08; H04W 68/02; H04W 72/042; H04W 76/11; H04W 84/042
See application file for complete search history.

(56) References Cited

U.S. PATENT DOCUMENTS

2014/0233520 A1    8/2014   Lee et al.
2016/0192354 A1    6/2016   Wei et al.
(Continued)

OTHER PUBLICATIONS

Sheng with U.S. Appl. No. 62/587,934, filed Nov. 17, 2017 (Year: 2017).*

(Continued)

*Primary Examiner* — Wutchung Chu
(74) *Attorney, Agent, or Firm* — Eschweiler & Potashnik, LLC

(57) ABSTRACT

An apparatus is configured to be employed within a user equipment (UE) device. The apparatus comprises baseband circuitry which includes a radio frequency (RF) interface and one or more processors. The one or more processors are configured to identify a plurality of monitoring occasions for a set of flexible control resource sets (CORESET); determine bit ordering for the plurality of monitoring occasions; generate hybrid automatic repeat request (HARQ) feedback based on the received downlink transmission; and incorporate the ordered plurality of monitoring occasions into the HARQ feedback.

12 Claims, 10 Drawing Sheets

(51) Int. Cl.
    *H04W 68/02* (2009.01)
    *H04L 5/00* (2006.01)
    *H04W 76/11* (2018.01)
    *H04W 72/04* (2009.01)
    *H04L 29/06* (2006.01)
    *H04L 1/00* (2006.01)
    *H04W 84/04* (2009.01)

(52) U.S. Cl.
    CPC ......... *H04W 68/02* (2013.01); *H04W 72/042* (2013.01); *H04W 76/11* (2018.02); *H04L 5/0023* (2013.01); *H04W 84/042* (2013.01)

(56) References Cited

U.S. PATENT DOCUMENTS

| | | | |
|---|---|---|---|
| 2018/0042028 A1* | 2/2018 | Nam | H04B 7/0626 |
| 2018/0270799 A1* | 9/2018 | Noh | H04L 1/1812 |
| 2018/0324804 A1* | 11/2018 | Aiba | H04L 5/0092 |
| 2018/0367263 A1* | 12/2018 | Ying | H04W 72/1273 |
| 2018/0367283 A1* | 12/2018 | Huang | H04L 5/0055 |
| 2019/0045533 A1* | 2/2019 | Chatterjee | H04W 72/0446 |
| 2019/0069256 A1* | 2/2019 | Jung | H04W 72/0453 |
| 2019/0074929 A1* | 3/2019 | Aiba | H04W 76/27 |
| 2019/0103943 A1* | 4/2019 | Wang | H04L 1/1861 |
| 2019/0149271 A1* | 5/2019 | Yin | H04L 1/1816 370/329 |
| 2019/0150123 A1* | 5/2019 | Nogami | H04W 72/042 370/330 |
| 2019/0150124 A1* | 5/2019 | Nogami | H04W 72/0446 370/330 |
| 2019/0158205 A1* | 5/2019 | Sheng | H04L 5/0048 |
| 2019/0199477 A1* | 6/2019 | Park | H04L 1/0693 |
| 2019/0207667 A1* | 7/2019 | Zhou | H04W 24/10 |
| 2019/0208506 A1* | 7/2019 | Baldemair | H04L 1/1614 |
| 2019/0215048 A1* | 7/2019 | Cirik | H04B 7/088 |
| 2019/0215126 A1* | 7/2019 | Choi | H04W 72/1205 |
| 2019/0215781 A1* | 7/2019 | Jeon | H04W 76/32 |
| 2019/0215861 A1* | 7/2019 | Son | H04W 56/0045 |
| 2019/0215896 A1* | 7/2019 | Zhou | H04B 7/0695 |
| 2019/0215897 A1* | 7/2019 | Babaei | H04W 76/28 |
| 2019/0230685 A1* | 7/2019 | Park | H04W 72/0453 |
| 2019/0289513 A1* | 9/2019 | Jeon | H04W 52/40 |
| 2020/0067651 A1* | 2/2020 | Takeda | H04L 1/0003 |
| 2020/0154467 A1* | 5/2020 | Gong | H04W 24/08 |
| 2020/0177352 A1* | 6/2020 | Peng | H04L 1/18 |
| 2020/0195386 A1* | 6/2020 | Marinier | H04L 1/1896 |
| 2020/0213065 A1* | 7/2020 | Takeda | H04L 5/0005 |

OTHER PUBLICATIONS

Chatterjee with U.S. Appl. No. 62/556,175, filed Sep. 8, 2017 (Year: 2017).*

Wang et al. CN 201710911429.X filed on Sep. 29, 2017 (Year: 2017).*

* cited by examiner

RESOURCE SET CONFIGURATIONS USING AUTOMATIC REPEAT REQUEST INFORMATION

REFERENCE TO RELATED APPLICATIONS

This application claims the benefit of U.S. Provisional Application No. 62/616,752, filed Jan. 12, 2018, the contents of which are herein incorporated by reference in their entirety.

FIELD

Various embodiments generally relate to the field of wireless communications.

BACKGROUND

Wireless or mobile communication involves wireless communication between two or more devices. The communication requires resources to transmit data from one device to another and/or to receive data at one device from another.

Various resources are assigned and utilized for communication. These resources can include resource blocks, frequency blocks, time blocks, and the like. Once assigned, multiple devices can then utilize the resources to perform communication.

However, the configuration of the resources can be problematic. The exchange of resource configurations can itself utilize valuable resources leaving fewer resources available for other applications. Further, resource configurations can be misinterpreted resulting in improper use of resources.

What are needed are techniques to facilitate the allocation and use of resources for wireless communication systems.

DETAILED DESCRIPTION

Figure 1:
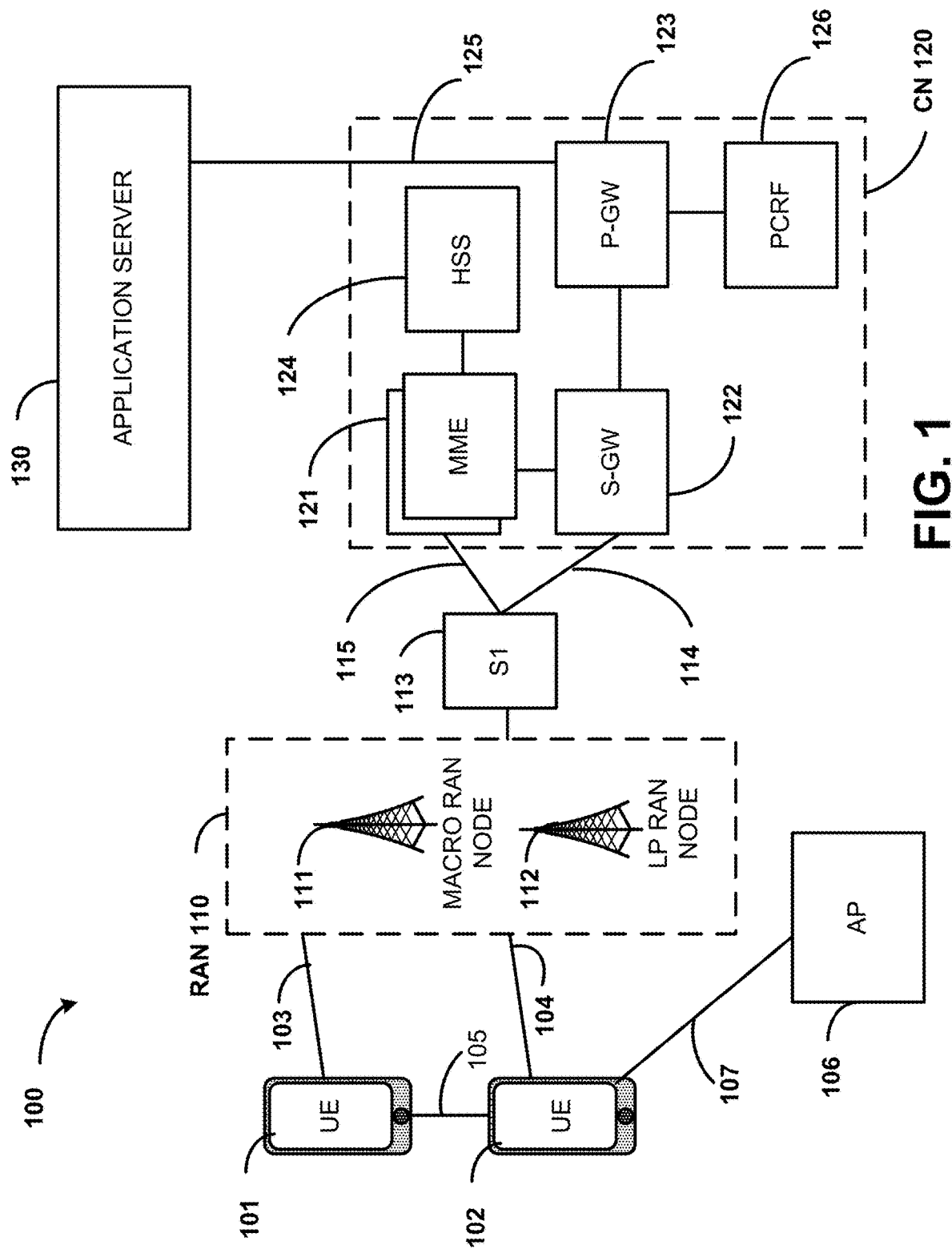
FIG. 1 illustrates an architecture of a system of a network in accordance with some embodiments.

The present disclosure will now be described with reference to the attached drawing figures, wherein like reference numerals are used to refer to like elements throughout, and wherein the illustrated structures and devices are not necessarily drawn to scale. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. Embodiments herein may be related to NR, RAN1, RAN2, 5G and the like.

As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

It is appreciated that there is a continuing need for techniques to improve data rates, reliability and performance. These techniques include better utilization and configuration of resources used for wireless communication and reduction of overhead.

Wireless communication systems involve nodes, such as a base station, communicating with devices, such as user equipment (UE) devices. The nodes can also include evolved Node Bs (eNBs), next Generation Node Bs (gNBs), and the like. These systems utilize downlink (DL) communications/transmissions from the base stations to the UE devices and uplink (UL) communications/transmissions from the UE devices to the base stations. Various techniques and schemes can be used for uplink and downlink communications.

Bandwidth parts (BWPs) indicate resource blocks designated for UL and DL communications. The resource blocks (RBs) can be carrier resource blocks (CRBs), physical resource blocks (PRBs), and the like. In one example, a BWP is a set of contiguous resource blocks.

New radio (NR) system specifications and the like plan to support a variety of services types (e.g., enhanced mobile broad band (eMBB), and ultra-reliable low latency communications (URLLC) and the like). Allowing sufficiently flexible control resource sets (CORESET) configurations with different periodicity and offsets and the like are significant to provide these services. These flexible CORESET configurations permit resource configuration and utilization that allows communications to be adapted and modified to meet resource requirements for these services.

In NR, a CORESET includes time-domain and frequency-domain resources. In the time domain, a CORESET can semi-statically configured with one or a set of contiguous OFDM symbols (up to 3 OFDM symbols) and it can be located anywhere in a slot. The configuration indicates a starting OFDM symbol and time duration. In the frequency domain, a CORESET can be located anywhere in the frequency range of the carrier (not outside the active Bandwidth Part). Additionally, the CORESET comprises multiple resource bocks. This provides flexibility to blank-out certain CORESET or to configure overlapping CORESET provides greater flexibility and mitigate inter cell interference.

The CORESET configurations can provide dynamic indication of hybrid automatic repeat request (HARQ)—acknowledge (ACK) timing for each CORESET to support adapting the air interface to variations in traffic. As a result, HARQ-ACK bits associated with multiple CORESET patterns of different component carriers (CCs) can be transmitted in a single uplink (UL) slot. The downlink (DL) slots sets associated with a single UL slot for HARQ-ACK feedback can be varied slot by slot.

Embodiments are disclosed that include techniques and/or methods to determine and order HARQ-ACK bits to support a multiple control resource set (CORESETs) (i.e. various periodicity and offset) on a given bandwidth part (BWP) or a single serving cell (i.e. component carrier (CC)) and the like. The CORESETs can be frequency division multiplexed (FDMed) resource sets. The HARQ-ACK or HARQ feedback includes various HARQ-ACK bits mapping and ordering designs to support flexible CORESETs configurations. Additionally, a last-PDCCH-based PUCCH resource mapping approach is also disclosed to mitigate UL control overhead and improve the UL resource efficiency. Further, a mapping approach for PUCCH resource allocation that can reduce collision probability and the like is also shown.

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but can also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 and 102 can be configured to connect, e.g., communicatively couple, with a radio access network (RAN) 110—the RAN 110 can be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 can further directly exchange communication data via a ProSe interface 105. The ProSe interface 105 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). A network device as referred to herein can include any one of these APs, ANs, UEs or any other network component. The RAN 110 can include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink (UL) and downlink (DL) dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH) can carry user data and higher-layer signaling to the UEs 101 and 102. The physical downlink control channel (PDCCH) can carry information about the transport format and resource allocations related to the PDSCH channel, among other things. It is appreciated that an MTC physical downlink control channel (MPDCCH) and/or an enhanced physical downlink control channel (EPDCCH) can be used in placed of the PDCCH. The It can also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) can be performed at any of the RAN nodes 111 and 112 based on channel quality information fed back from any of the UEs 101 and 102. The downlink resource assignment information can be sent on the PDCCH used for (e.g., assigned to) each of the UEs 101 and 102.

The PDCCH can use control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an enhanced physical downlink control channel (EPDCCH) that uses PDSCH resources for control information transmission. The EPDCCH can be transmitted using one or more enhanced control channel elements (ECCEs). Similar to above, each ECCE can correspond to nine sets of four physical resource elements known as an enhanced resource element groups (EREGs). An ECCE can have other numbers of EREGs in some situations.

The RAN 110 is shown to be communicatively coupled to a core network (CN) 120—via an S1 interface 113. In embodiments, the CN 120 can be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 can be similar in function to the control plane of legacy Serving General Packet Radio Service (GPRS) Support Nodes (SGSN). The MMEs 121 can manage mobility aspects in access such as gateway selection and tracking area list management. The HSS 124 can comprise a database for network users, including subscription-related information to support the network entities' handling of communication sessions. The CN 120 can comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 can terminate the S1 interface 113 towards the RAN 110, and routes data packets between the RAN 110 and the CN 120. In addition, the S-GW 122 can be a local mobility anchor point for inter-RAN node handovers and also can provide an anchor for inter-3GPP mobility. Other responsibilities can include lawful intercept, charging, and some policy enforcement.

The P-GW 123 can terminate an SGi interface toward a PDN. The P-GW 123 can route data packets between the CN network 120 and external networks such as a network including the application server 130 (alternatively referred to as application function (AF)) via an Internet Protocol (IP) interface 125. Generally, the application server 130 can be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 can further be a node for policy enforcement and charging data collection. Policy and Charging Enforcement Function (PCRF) 126 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 can be communicatively coupled to the application server 130 via the P-GW 123. The application server 130 can signal the PCRF 126 to indicate a new service flow and select the appropriate Quality of Service (QoS) and charging parameters. The PCRF 126 can provision this rule into a Policy and Charging Enforcement Function (PCEF) (not shown) with the appropriate traffic flow template (TFT) and QoS class of identifier (QCI), which commences the QoS and charging as specified by the application server 130.

In one or more embodiments, IMS services can be identified more accurately in a paging indication, which can enable the UEs 101, 102 to differentiate between PS paging and IMS service related paging. As a result, the UEs 101, 102 can apply preferential prioritization for IMS services as desired based on any number of requests by any application, background searching (e.g., PLMN searching or the like), process, or communication. In particular, the UEs 101, 102 can differentiate the PS domain paging to more distinguishable categories, so that IMS services can be identified clearly in the UEs 101, 102 in comparison to PS services. In addition to a domain indicator (e.g., PS or CS), a network (e.g., CN 120, RAN 110, AP 106, or combination thereof as an eNB or the other network device) can provide further, more specific information with the TS 36.331-Paging message, such as a "paging cause" parameter. The UE can use this information to decide whether to respond to the paging, possibly interrupting some other procedure like an ongoing PLMN search.

In one example, when UEs 101, 102 can be registered to a visited PLMN (VPLMN) and performing PLMN search (i.e., background scan for a home PLMN (HPLMN) or a higher priority PLMN), or when a registered UE is performing a manual PLMN search, the PLMN search can be interrupted in order to move to a connected mode and respond to a paging operation as part of a MT procedure/operation. Frequently, this paging could be for PS data (non-IMS data), where, for example, an application server 130 in the NW wants to push to the UE 101 or 102 for one of the many different applications running in/on the UE 101 or 102, for example. Even though the PS data could be delay tolerant and less important, in legacy networks the paging is often not able to be ignored completely, as critical services like an IMS call can be the reason for the PS paging. The multiple interruptions of the PLMN search caused by the paging can result in an unpredictable delay of the PLMN search or in the worst case even in a failure of the procedure, resulting in a loss of efficiency in network communication operations. A delay in moving to or handover to a preferred PLMN (via manual PLMN search or HPLMN search) in a roaming condition can incur more roaming charges on a user as well.

Figure 2:
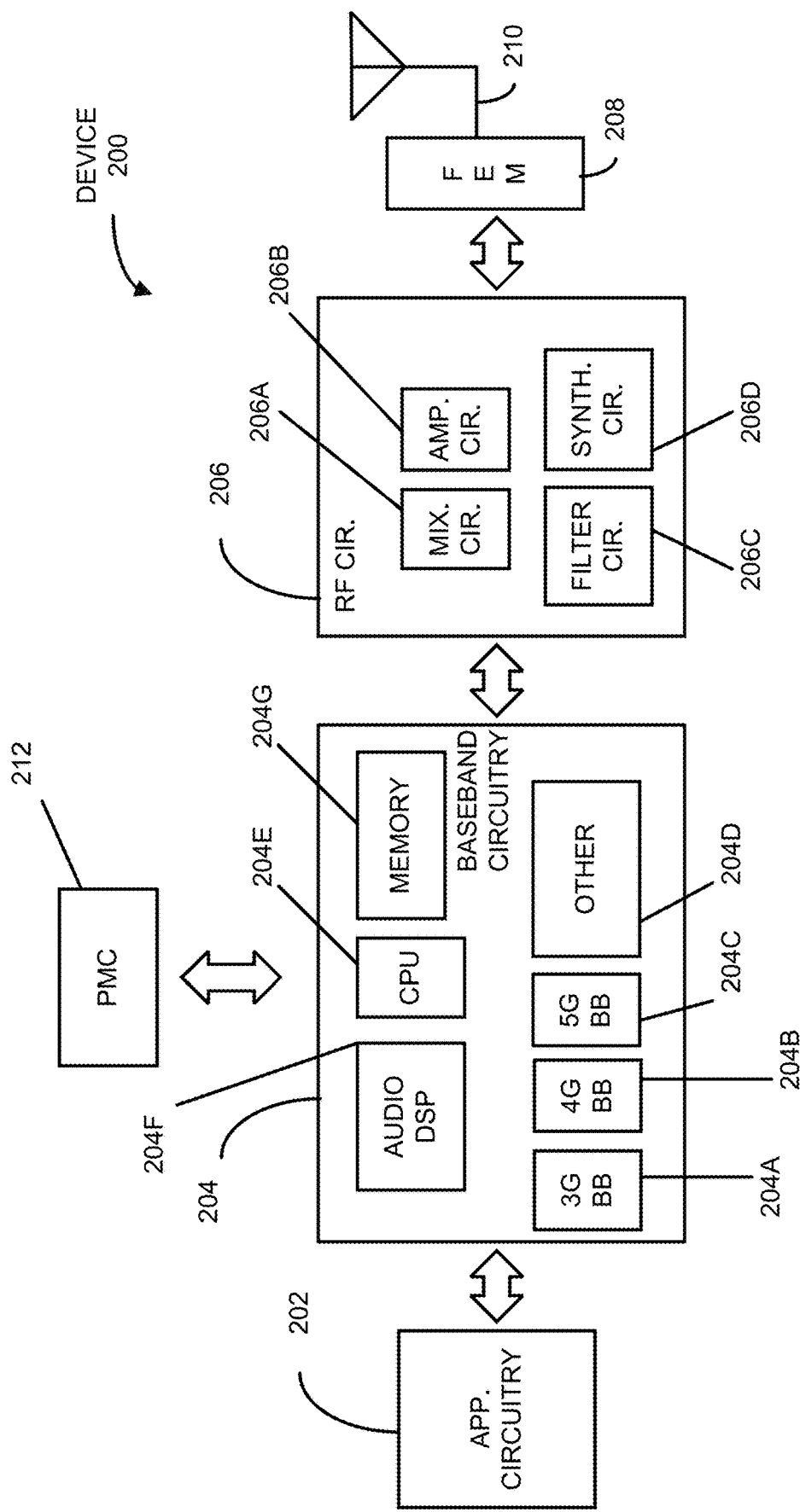
FIG. 2 illustrates example components of a network device in accordance with some embodiments.

FIG. 2 illustrates example components of a network device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE 101, 102 or a RAN node 111, 112, AP, AN, eNB or other network component. In some embodiments, the device 200 can include less elements (e.g., a RAN node can not utilize application circuitry 202, and instead include a processor/controller to process IP data received from an EPC). In some embodiments, the network device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), si2h generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FE M circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for superheterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 does not receive data in this state, in order to receive data, it transitions back to RRC_Connected state.

An additional power saving mode can allow a device to be unavailable to the network for periods longer than a paging interval (ranging from seconds to a few hours). During this time, the device can be unreachable to the network and can power down completely. Any data sent during this time can incur a large delay with the delay presumed to be acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node. Each of these layers can be implemented to operate one or more processes or network operations of embodiments/aspects herein.

In addition, the memory 204G can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In general, there is a move to provide network services for the packet domain. The earlier network services like UMTS or 3G and predecessors (2G) configured a CS domain and a packet domain providing different services, especially CS services in the CS domain as well as voice services were considered to have a higher priority because consumers demanded an immediate response. Based on the domain that the paging was received, the device 200 could assign certain priority for the incoming transaction. Now with LTE/5G most services are moving to the packet domain. Currently, the UE (e.g., 101, 102, or device 200) can get paging for a packet service without knowing any further information about the paging of the MT procedure, such as whether someone is calling on a line, a VoIP call, or just some packet utilized from Facebook, other application service, or other similar MT service. As such, a greater opportunity exists for further delays without the possibility for the UE to discriminate between the different application packets that could initiate a paging and also give a different priority to it based on one or more user preferences. This can could be important for the UE because the UE might be doing other tasks more vital for resource allocation.

In one example, a UE (e.g., 101, 102, or device 200) could be performing a background search for other PLMNs. This is a task the UE device 200 could do in regular intervals if it is not connected on its own home PLMN or a higher priority PLMN, but roaming somewhere else. A higher priority could be a home PLMN or some other PLMNs according to a list provided by the provider or subscriber (e.g., HSS 124). Consequently, if a paging operation arrives as an MT service and an interruption results, such that a start and begin operation are executed, a sufficient frequency of these interruptions could cause the UE to never complete a background search in a reasonable way. This is one way where it would be advantageous for the UE or network device to know that the interruption is only a packet service, with no need to react to it immediately, versus an incoming voice call that takes preference immediately and the background scan should be postponed.

Additionally, the device 200 can be configured to connect or include multiple subscriber identity/identification module (SIM) cards/components, referred to as dual SIM or multi SIM devices. The device 200 can operate with a single transmit and receive component that can coordinate between the different identities from which the SIM components are operating. As such, an incoming voice call should be responded to as fast as possible, while only an incoming packet for an application could be relatively ignored in order to utilize resources for the other identity (e.g., the voice call or SIM component) that is more important or has a higher priority from a priority list/data set/or set of user device preferences, for example. This same scenario can also be utilized for other operations or incoming data, such as with a PLMN background search such as a manual PLMN search, which can last for a long period of time since, especially with a large number of different bands from 2G, etc. With an ever increasing number of bands being utilized in wireless communications, if paging interruptions come in between the operations already running without distinguishing between the various packet and real critical services such as voice, the network devices can interpret this manual PLMN search to serve and ensure against a drop or loss of any increment voice call, with more frequent interruptions in particular.

As stated above, even though in most of these cases the PS data is delay tolerant and less important, in legacy networks the paging cannot be ignored completely, as critical services like an IMS call can be the reason for the PS paging. The multiple interruptions of a PLMN search caused by the paging can result in an unpredictable delay of the PLMN search or in the worst case even in a failure of the procedure. Additionally, a delay in moving to preferred PLMN (via manual PLMN search or HPLMN search) in roaming condition can incur more roaming charges on user. Similarly, in multi-SIM scenario when UE is listening to paging channel of two networks simultaneously and has priority for voice service, a MT IMS voice call can be interpreted as "data" call as indicated in MT paging message and can be preceded by MT Circuit Switched (CS) paging of an other network or MO CS call initiated by user at same time. As such, embodiments/aspects herein can increase the call drop risk significantly for the SIM using IMS voice service.

In embodiments, 3GPP NW can provide further granular information about the kind of service the network is paging for. For example, the Paging cause parameter could indicate one of the following values/classes/categories: 1) IMS voice/video service; 2) IMS SMS service; 3) IMS other services (not voice/video/SMS-related; 4) any IMS service; 5) Other PS service (not IMS-related). In particular, a network device (e.g., an eNB or access point) could only be discriminating between IMS and non-IMS services could use 4) and 5), whereas a network that is able to discriminate between different types of IMS services (like voice/video call, SMS, messaging, etc.) could use 3) instead of 4) to explicitly indicate to the UE that the paging is for an IMS service different from voice/video and SMS. By obtaining this information UE may decide to suspend PLMN search only for critical services like incoming voice/video services.

In other aspects, dependent on the service category (e.g., values or classes 1-5 above), the UE 101, 102, or device 200 can memorize that there was a paging to which it did not respond, and access the network later, when the PLMN search has been completed and the UE decides to stay on the current PLMN. For example, if the reason for the paging was a mobile terminating IMS SMS, the MME can then inform the HSS (e.g., 124) that the UE is reachable again, and the HSS 124 can initiate a signaling procedure which will result in a delivery of the SMS to the UE once resources are more available or less urgent for another operation/application/or category, for example. To this purpose the UE 101, 102, or 200 could initiate a periodic tau area update (TAU) procedure if the service category in the Paging message indicated "IMS SMS service", for example.

Figure 3:
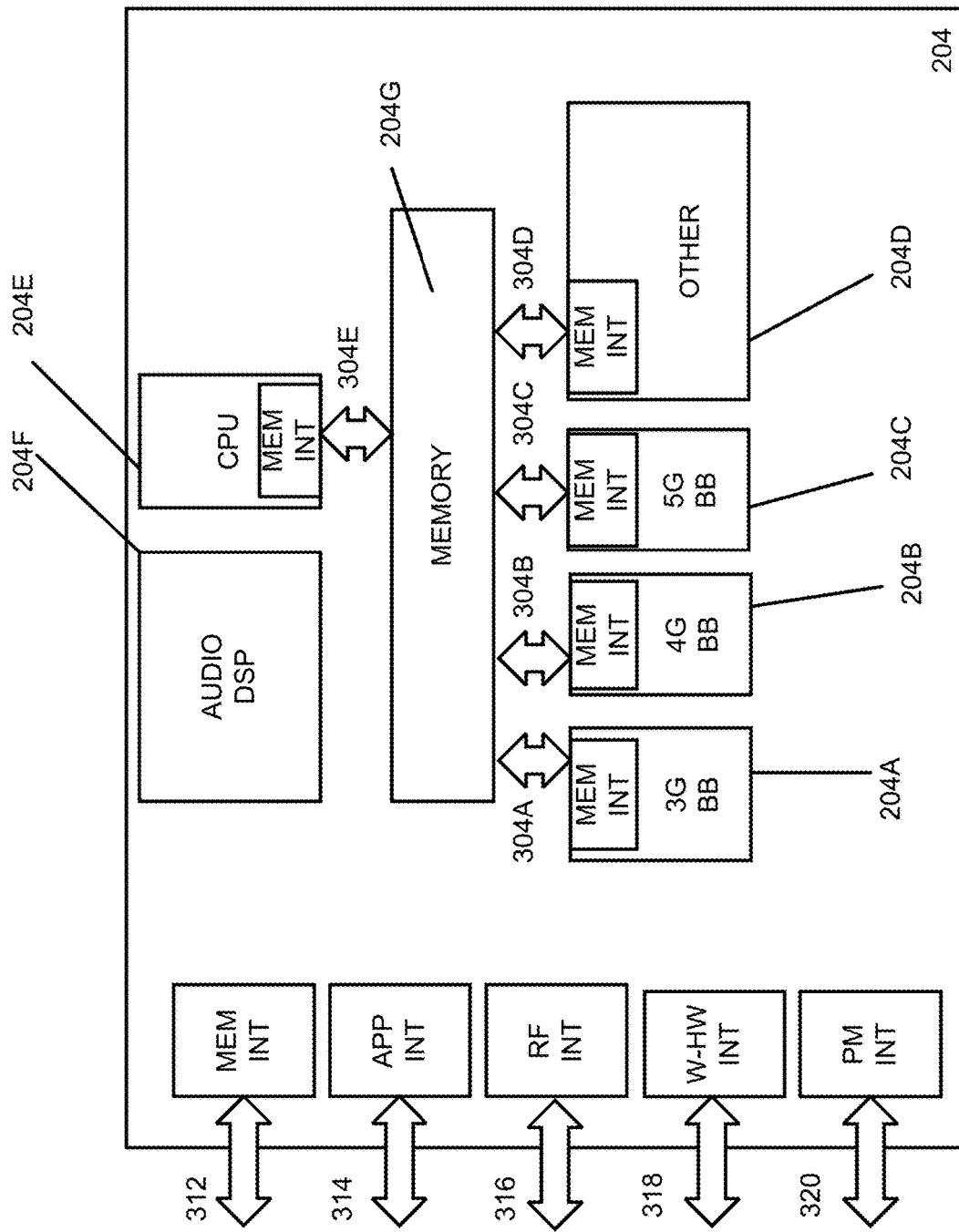
FIG. 3 illustrates example interfaces of baseband circuitry in accordance with some embodiments.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212.

Figure 4:
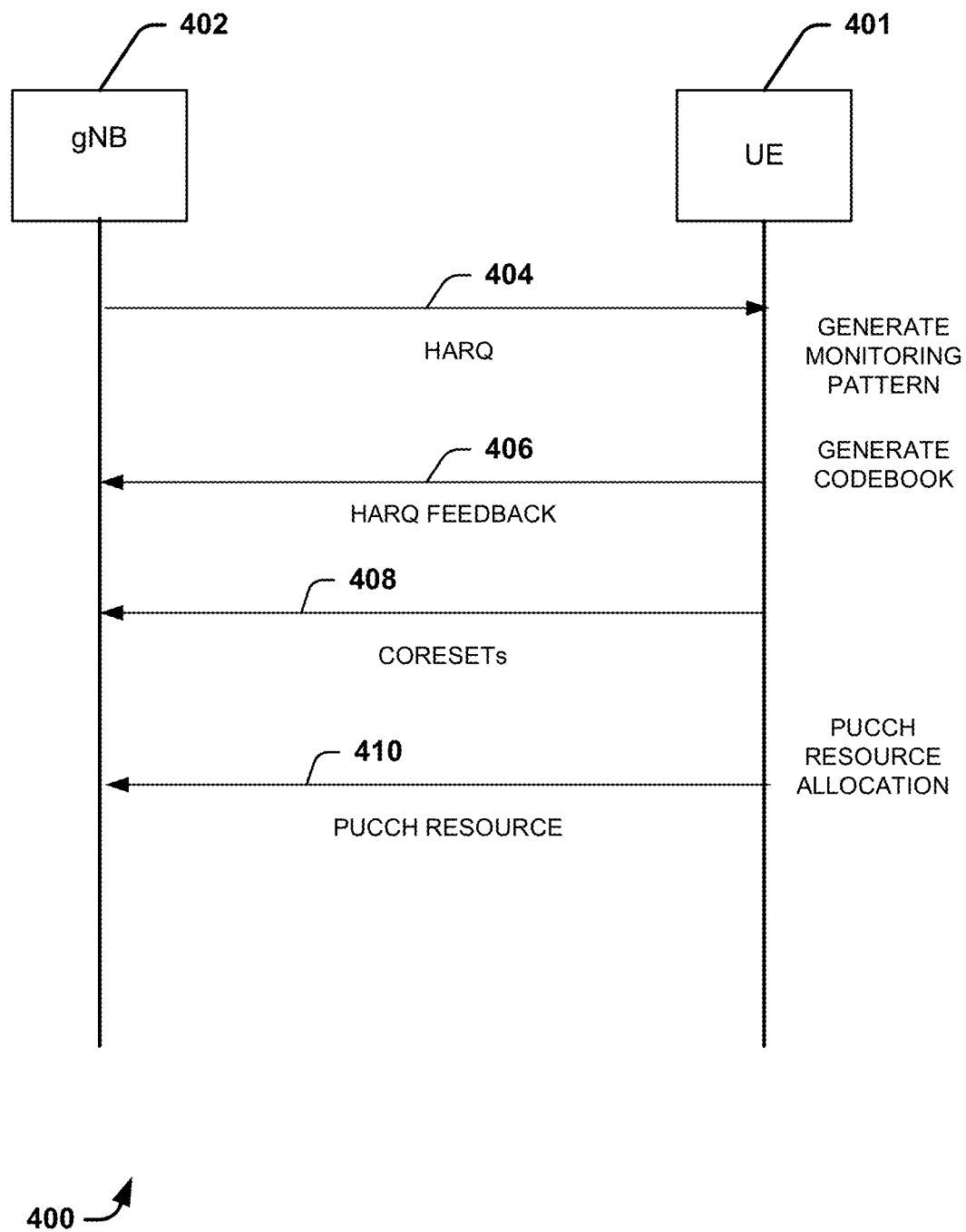
FIG. 4 is a diagram illustrating an architecture of a system that facilitates use of flexible control resource sets (CORESET) configurations in accordance with some embodiments.

FIG. 4 is a diagram illustrating an architecture of a system 400 that facilitates use of flexible control resource sets (CORESET) configurations in accordance with some embodiments. The system or apparatus 400 can be utilized with the above embodiments and variations thereof, including the system 100 described above. The system 400 is provided as an example and it is appreciated that suitable variations are contemplated.

The system 400 is configured to determine HARQ-ACK bits and to order HARQ-ACK bits to support multiple flexible control resource sets (CORESETs), which can have varied periodicity and offsets. The support is provided for multiple CORESETs on a BWP, serving cell, component carrier (CC) and/or the like. The CORESETs can by FDMed resource sets.

The system 400 can be and/or be part of a 5G New Radio (NR) mobile communications system. Further, the system 400 can facilitate HARQ-ACK feedback and HARQ operation efficiency while mitigating the HARQ-ACK feedback payload.

The system 400 can send HARQ and HARQ-ACK information/feedback in wireless communication systems. Some examples of wireless communication systems that can be used include a multi-carrier wireless communication system, single carrier systems, single carrier systems with bandwidth parts, and the like.

In one example, the system 400 can send HARQ-ACK information/feedback for a single carrier system with multiple active bandwidth parts (BWPs) or multiple control resource sets configured on active DL BWPs on each activated service cell for PDCCH candidates monitoring.

The system 400 includes a network device 401 and a node 402. The device 401 is shown as a UE device and the node 402 is shown as gNB for illustrative purposes. It is appreciated that the UE device 401 can be other network devices, such as APs, ANs and the like. It is also appreciated that the gNB 402 can be other nodes or access nodes (ANs), such as a base station (BS), eNB, gNB, RAN nodes, UE and the like. Other network or network devices can be present and interact with the device 401 and/or the node 402. Operation of the device 401 and/or the node 402 can be performed by circuitry, such as the baseband circuitry 204, described above.

Generally, downlink (DL) transmissions occur from the gNB 402 to the UE 401 whereas uplink (UL) transmissions occur from the UE 401 to the gNB 402. The downlink transmissions typically utilize a DL control channel and a DL data channel. The uplink transmissions typically utilize an UL control channel and a UL data channel. The various channels can be different in terms of direction, link to another gNB, eNB and the like.

The UE 401 is one of a set or group of UE devices assigned to or associated with a cell of the gNB 402. The UE 401 can be configured with a secondary cell group (SCG) and/or a master cell group (MCG). Within a cell group, there can be a primary cell, secondary cell, serving cell and the like that belong with the group. The UE 401 can be associated or configured with one or more cell within the cell group.

Resources for the UE 401 can be allocated for UL and/or DL communications/transmissions. One or more flexible CORESETs can be used for the UE 401 and the gNB 402.

As part of a DL transmission, the gNB 402 sends a HARQ transmission 404. The HARQ transmission can be part of a DL, such as a PDSCH and the like. The HARQ transmission 404 can use multiple slots and CCs.

In response, the UE 401 generates HARQ feedback 406. The HARQ feedback 406 includes a HARQ-ACK (ACK/NACK) response to the HARQ. Additionally, the HARQ feedback or HARQ-ACK includes monitoring patterns 408 for CORESET configurations. The monitoring patterns 408 include a plurality of monitoring occasions for a set of CORESETs.

The UE 401 generates the monitoring patterns based on one or more monitoring factors. The patterns include monitoring occasions ordered based on the one or more monitoring factors. The monitoring factors and the like can be provided by signaling and the like.

In one example, the UE 401 is configured with a higher layer parameter HARQ-ACK-codebook=semi-static (i.e., Type-1 HARQ-ACK code book determination or semi-static HARQ-ACK codebook determination). Here, the UE 401 determines $\tilde{O}_0^{ACK}, \tilde{O}_1^{ACK}, \ldots, \tilde{O}_{O_0^{ACK}-1}^{ACK}$ HARQ-ACK bits order (i.e., of a HARQ-ACK codebook) for transmission in a PUCCH or PUSCH. The bit order, in this example, can be determined according to a predefined priority order at least based on:

a Time index,
a CC index,
an active BWP index when more than one BWPs are located on a CC; and
a CORESET index when more than one CORESETs are configured in an active BWP or single CC.

In another example, a priority order for HARQ-ACK bits/mapping is defined/determined as: Time index>CC index>BWP index>CORESET index. This approach, also referred to as approach-1, the UE 401 generates HARQ-ACK bits for transmission in increasing order of CORESET index in a lowest BWP/serving cell index in the lower time index and then in increasing order of BWP index and then in increasing order of serving cell index in the lower time index and then in increasing order of time index. Additional approaches to ordering HARQ-ACK bits are provided below.

Figure 5:
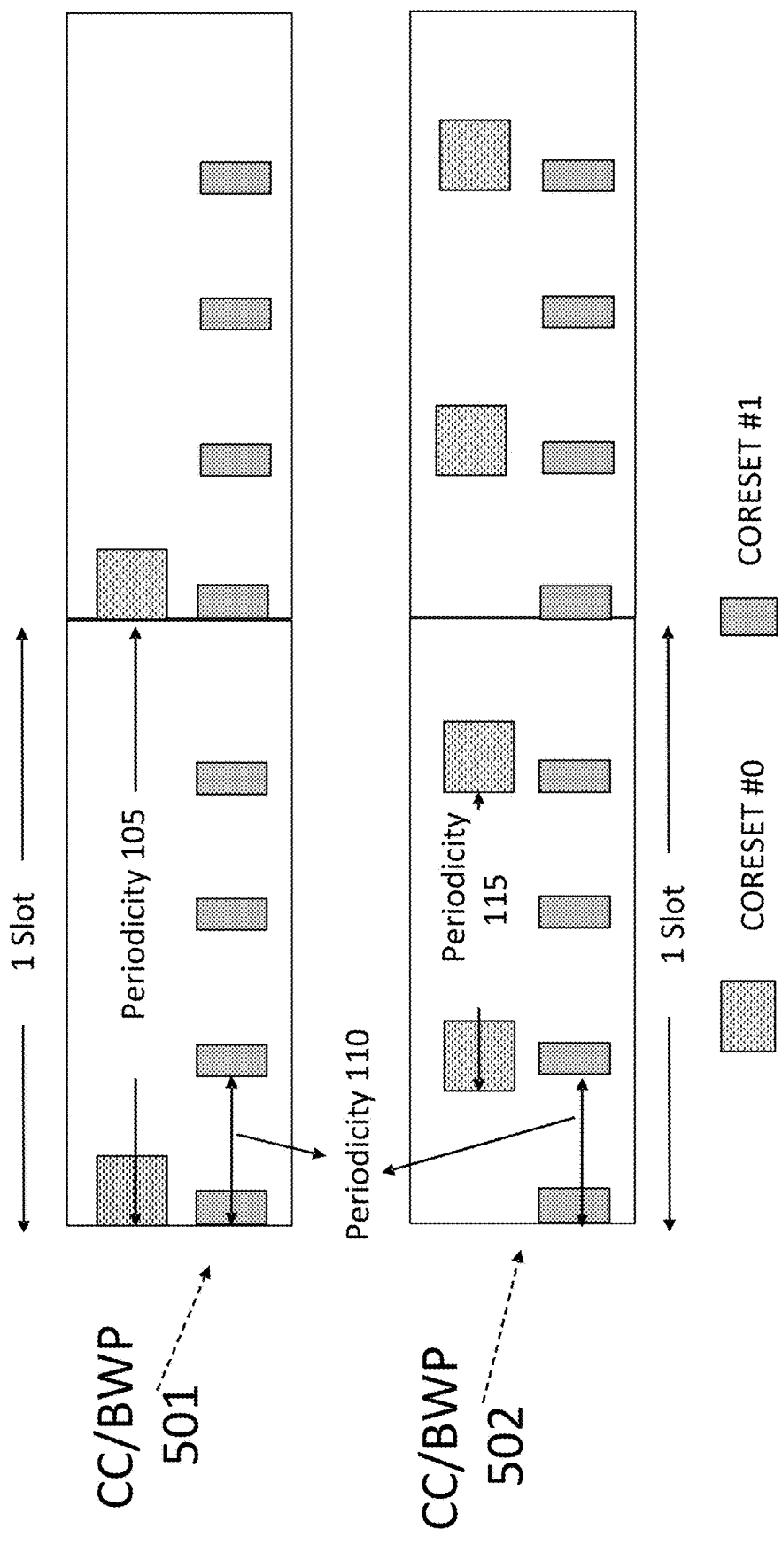
FIG. 5 is a diagram illustrating an example of a suitable CORESET configurations in accordance with one or more embodiments.

FIG. 5 is a diagram illustrating an example of a suitable CORESET configurations or patterns 500 in accordance with one or more embodiments.

The configurations 500 can be used with such as a 5G New Radio (NR) mobile/wireless communication system, the system 400, and the like. The system includes a UE, such as the UE 401, configured with two downlink (DL) serving cells or component carriers (CCs) or multiple BWPs on a single CC.

Time is depicted along a horizontal x-axis and frequency is depicted along a vertical y-axis.

In this example, the UE is configured with distinct or separate PDCCH monitoring patterns on two CCs. The PDCCH monitoring pattern is shown for CORESET #0 and #1 with a PDCCH monitoring periodicity/offset 105, 110 on CC/BWP 101 and a PDCCH monitoring periodicity/offset 110, 115 on CC/BWP 102. The monitoring pattern includes a plurality of monitoring occasions for CORESET #0 and #1. In this example, there are 22 monitoring occasions, 6 for CORESET #0 and 16 for CORESET #1.

FIG. 5 shows patterns for a first CC 501 and a second CC 502. It is appreciated that a serving cell, BWP and the like can be used instead of a CC. PDCCH monitoring patterns for the first CC 501 and the second CC 502 are provided.

The monitoring pattern includes a periodicity and offset for one or more slots for one or more CORESET configurations. The monitoring pattern can be specific to a CC, cell or BWP.

The slot contains a number of symbols, blocks or bits.

A first PDCCH monitoring pattern is for the first CC 501 and includes a CORESET #0 and a CORESET #1. The first monitoring pattern has a periodicity/offset of 105 for the CORESET #0 and a periodicity/offset of 110 for the CORESET #1. The first monitoring pattern includes 10 monitoring occasions, two for the CORESET #0 and eight for the CORESET #1.

A second PDCCH monitoring pattern is for the second CC 502 and has a periodicity/offset of 110 for the CORESET #1 and a periodicity/offset of 115 for the CORESET #0. The second monitoring pattern includes 12 monitoring occasions, four for the CORESET #0 and eight for the CORESET #1.

The CORESET #0 and #1 are at varied frequencies as shown. A second slot for the CC 501 is also shown for the CORESET #0 and CORESET #1. The second slot has the same pattern as the first slot.

It is appreciated that additional CORESETs can be present in the monitoring patterns.

Further, the example CORESETs are shown having distinct frequency resources. However, it is appreciated that the monitoring pattern can include varied time and/or frequency resources.

Figure 6:
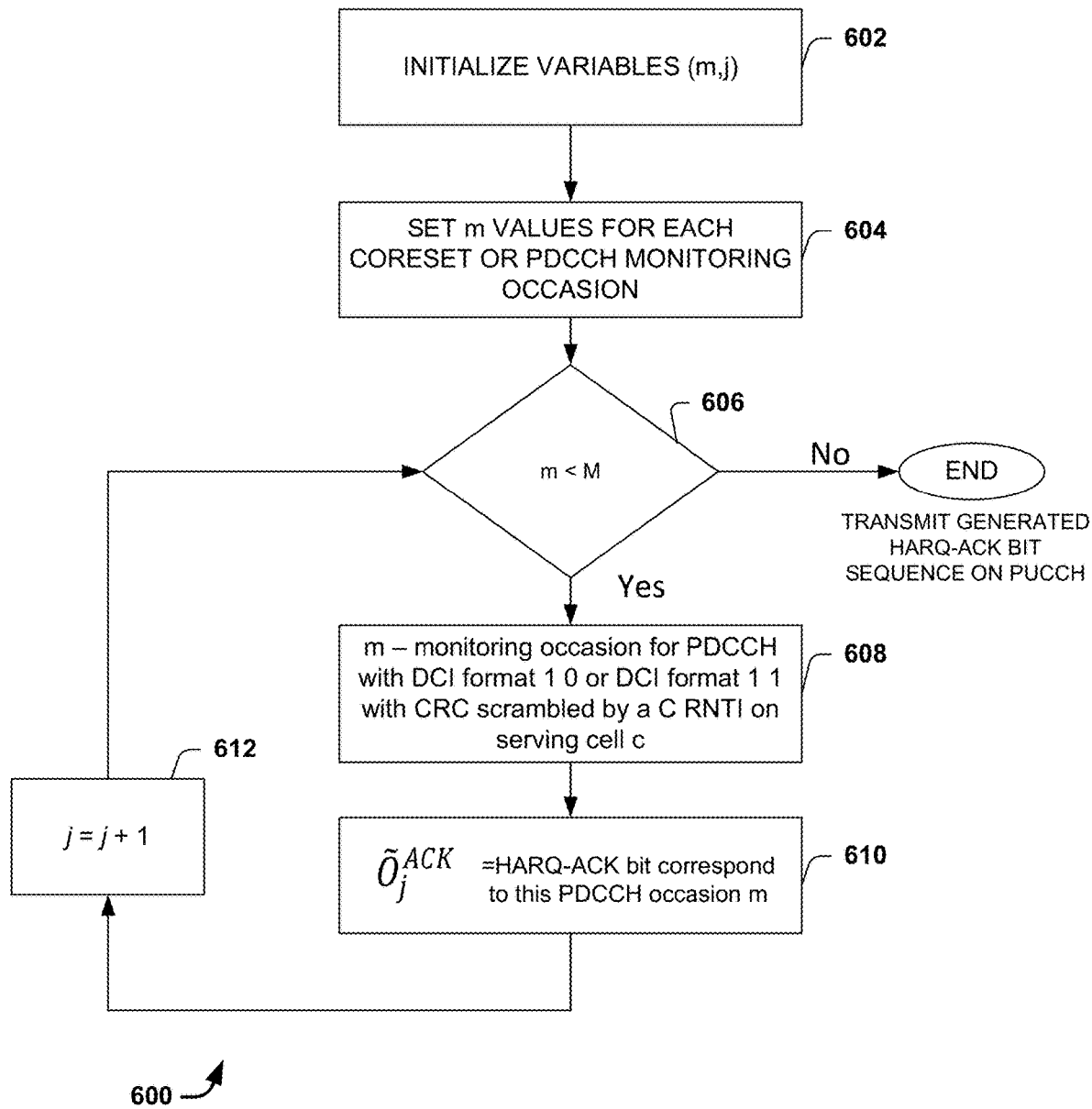
FIG. 6 is a flow diagram illustrating a method of ordering HARQ feedback bits in accordance with one or more embodiments.

FIG. 6 is a flow diagram illustrating a method 600 of ordering HARQ feedback bits in accordance with one or more embodiments. The method 600 is a semi-static HARQ-ACK codebook determination process.

The method 600 can be utilized with the architecture 400 and variations thereof. Further, the method 600 can be performed by and/or with the UE 401. Additionally, the patterns 500 are referenced for illustrative purposes, however it is appreciated that other patterns and varied monitoring occasions are contemplated.

The method 600 begins at block 602, where a UE sets initial values for ordering parameters. The parameters include m and j. The initial values are set as =0, j=0, where m is a PDCCH monitoring occasion index and j is a HARQ-ACK bit index.

For the example shown in FIG. 5, m can have values=0, 1, 2, . . . 21 and j can have values=0, 1, 2, . . . <17. It is appreciated that other values can be used for other examples or implementations.

At block 604, "m" values are set for each CORESET or PDCCH monitoring occasion across BWPs/CCs. The values are set in the order of increasing frequency first and then in increasing order of time starting at the lowest frequency. With this approach, a lower index value of "m" corresponds to earlier PDCCH monitoring occasion.

If there are multiple CORESETs located in a BWPs/CCs in a FDMed manner, such as shown in FIG. 5, the lower index value of "m" corresponds to a PDCCH monitoring occasion in the lower CORESET index of the lower BWP index in the lower CC.

The UE determines whether the HARQ-ACK bits mapping process has been conducted for all PDCCH monitoring occasions associated with a PUCCH for the UE. Thus, the value of m is compared with a value of M at block 606. If m is greater than or equal to M, the method 600 is complete and the generated HARQ-ACK bit sequence order is transmitted by the UE on a selected PUCCH. Otherwise, the method 600 continues to block 608.

The UE determines whether the monitoring occasion m is configured for PDCCH with DCI format 1-0 or DCI format 1_1 with CRC scrambled by the C-RNTI on serving cell at block 608. In some examples, the determination can also include the SPS release PDCCH. The HARQ-ACK payload size is reduced because there is no requirement to map HARQ-ACK bits for the message, except unicast PDSCH data.

The UE generates the HARQ-ACK bit corresponding to the received transport block at block 610. Thus, $O_j^{ACK}$ is set to the HARQ-ACK bit corresponding to this PDCCH occasion m.

After performing block 610, the method 600 moves to block 612 where j is incremented by one.

It is appreciated that the UE is configured with HARQ-ACK spatial bundling without Code block group (CBG), in this example.

As a result, one HARQ-ACK is generated for the PDCCH monitoring occasion m at block 610. The HARQ-ACK can comprise multiple bits. Further, it is appreciated that multiple HARQ-ACK can be generated with each for a transport block (TB) or one CBG. The variable m can also be incremented.

Figure 7:
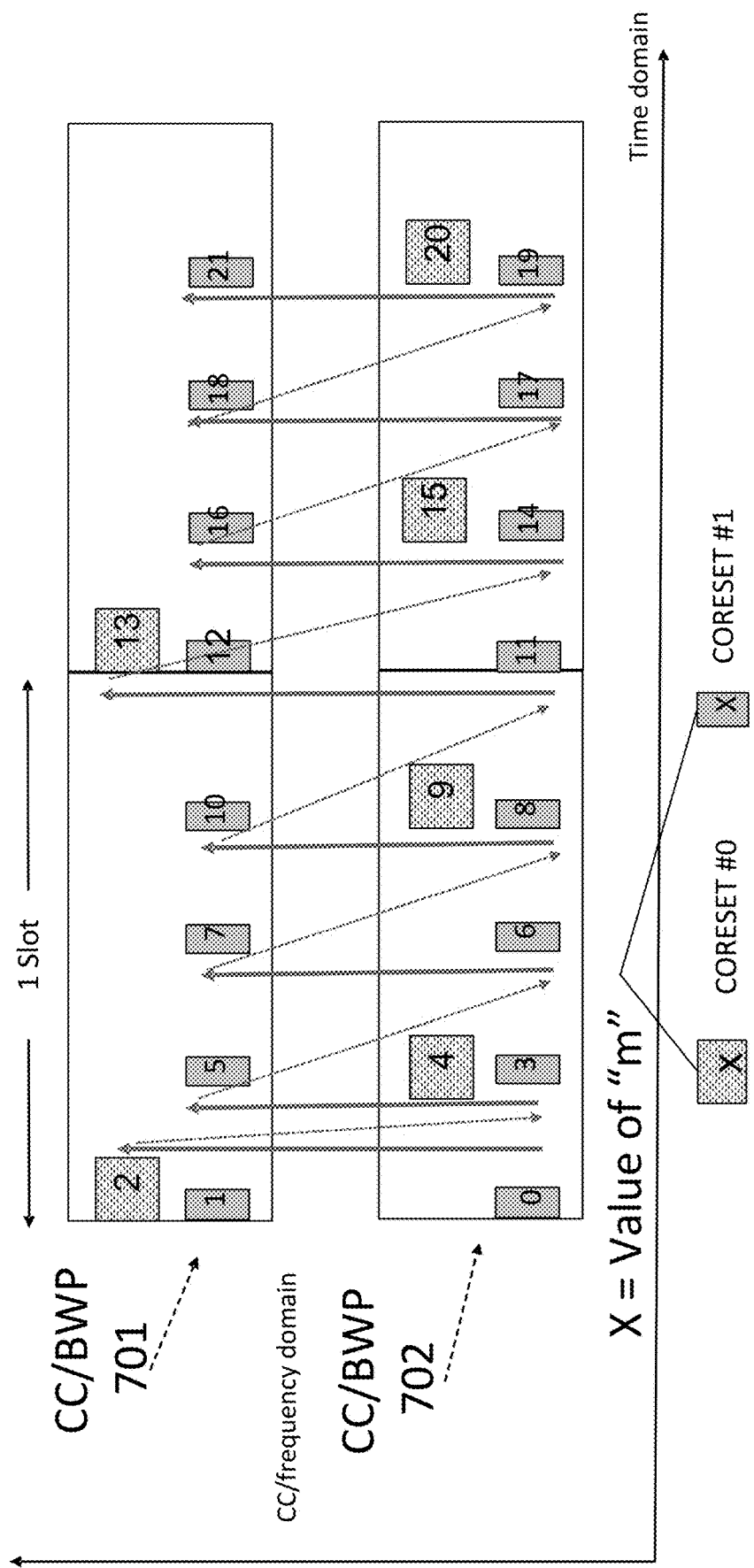
FIG. 7 is a diagram illustrating an example of suitable monitoring occasion indexing or configurations in accordance with one or more embodiments.

FIG. 7 is a diagram illustrating an example of suitable monitoring occasion indexing or configurations 700 in accordance with one or more embodiments. The indexing 700 includes ordering according to the Approach-1, described above.

Here, a priority order for HARQ-ACK mapping is defined/determined as: Time index>CC index>BWP index>CORESET index. This approach-1 generates HARQ-ACK bits for transmission in increasing order of CORESET index in a lowest BWP/serving cell index in the lower time index and then in increasing order of BWP index and then in increasing order of serving cell index in the lower time index and then in increasing order of time index.

The indexing/ordering illustrates setting the "m" value setting associated with each CORESET for the method 600, described above. The value of m ranges from 0 to 21 and M has a value of 22, in this example.

For example, monitoring occasions 0, 1 and 2 have the same time index, but '0' has a lower CC index. Thus, '0' is ordered before '1' and '2'.

Monitoring occasions '1' and '2' have the same time index and the same CC index, but different CORESET indices. It is assumed that the CORESET #1 has a lower index than the CORESET #0 in this example. Thus, the monitoring occurrence '1' has lower CORESET index than the monitoring occurrence '2'.

It is appreciated that example values are provided in FIG. 7 for illustrative purposes and that other suitable values can be employed.

Figure 8:
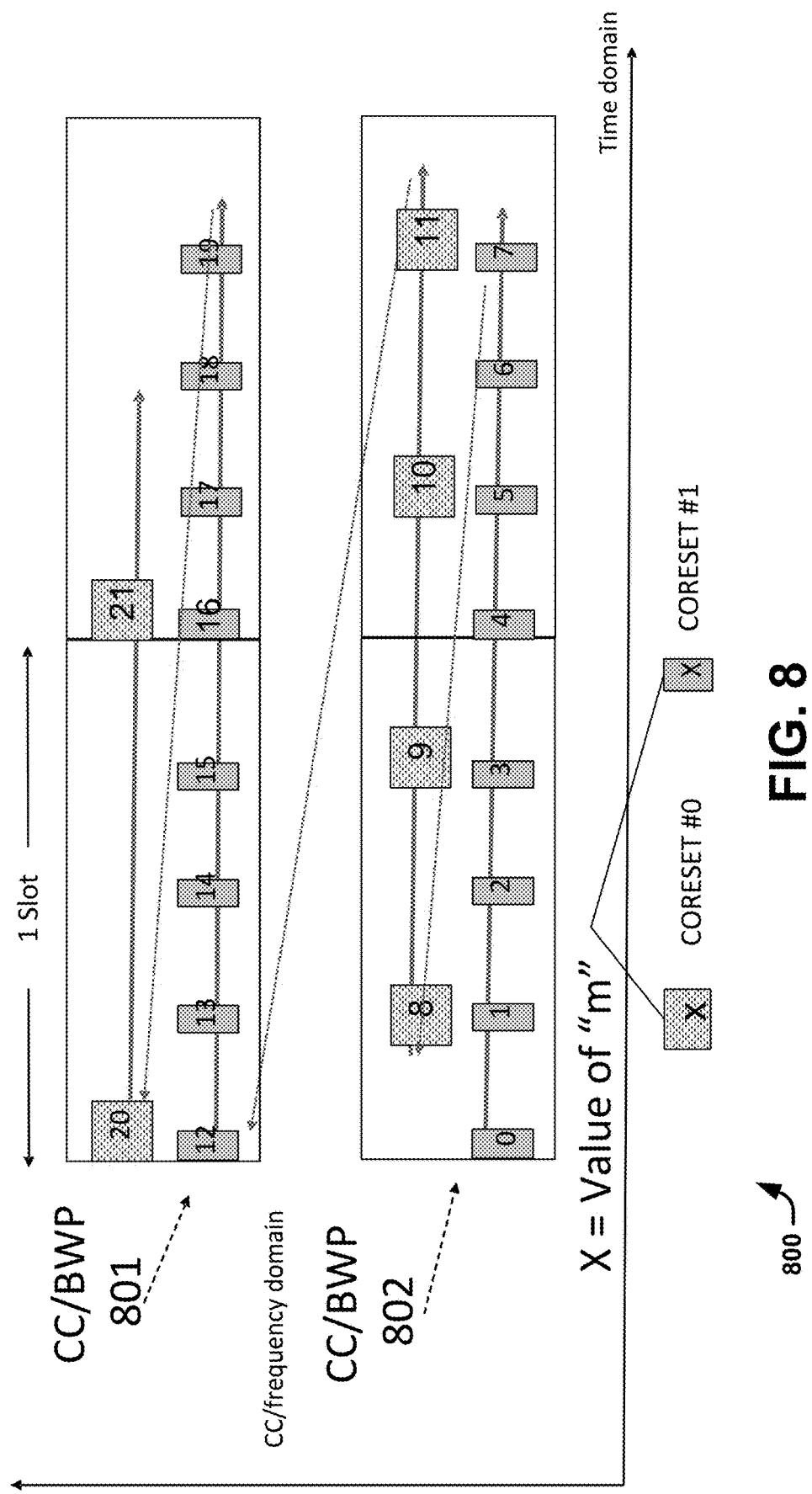
FIG. 8 is a diagram illustrating an example of suitable monitoring occasion indexing or configurations in accordance with one or more embodiments.

FIG. 8 is a diagram illustrating an example of suitable monitoring occasion indexing or configurations 800 in accordance with one or more embodiments. The indexing 800 includes ordering according to the Approach-2, described below.

For approach-2, the priority order for HARQ-ACK mapping is: CC index>BWP index>CORESET index>time index. The UE generates HARQ-ACK bits for transmission in increasing order of time index in the lowest CORESET index in the lowest BWP/serving cell index, and then in increasing order of CORESET index in the lower BWP/CC index and then in increasing order of CC and/or BWP index.

FIG. 8 shows resulting "m" values using Approach-2 still assuming the system 400 of FIG. 4.

The same HARQ-ACK ordering process 600 can be used for HARQ-ACK codebook determination after the value of m is set using Approach-2 at block 604.

The indexing/ordering illustrates setting the "m" value setting associated with each CORESET for the method 600, described above. The value of m ranges from 0 to 21 and M has a value of 22, in this example.

The ordering based on the Approach-2 results in different ordering than shown by approach-1 in FIG. 7.

Here, the monitoring occasion '0' is the same. However, the monitoring occasion '1' of FIG. 7 is ordered as '12' in FIG. 8 and the monitoring occasion of '2' of FIG. 7 is ordered as '20' in FIG. 8.

Figure 9:
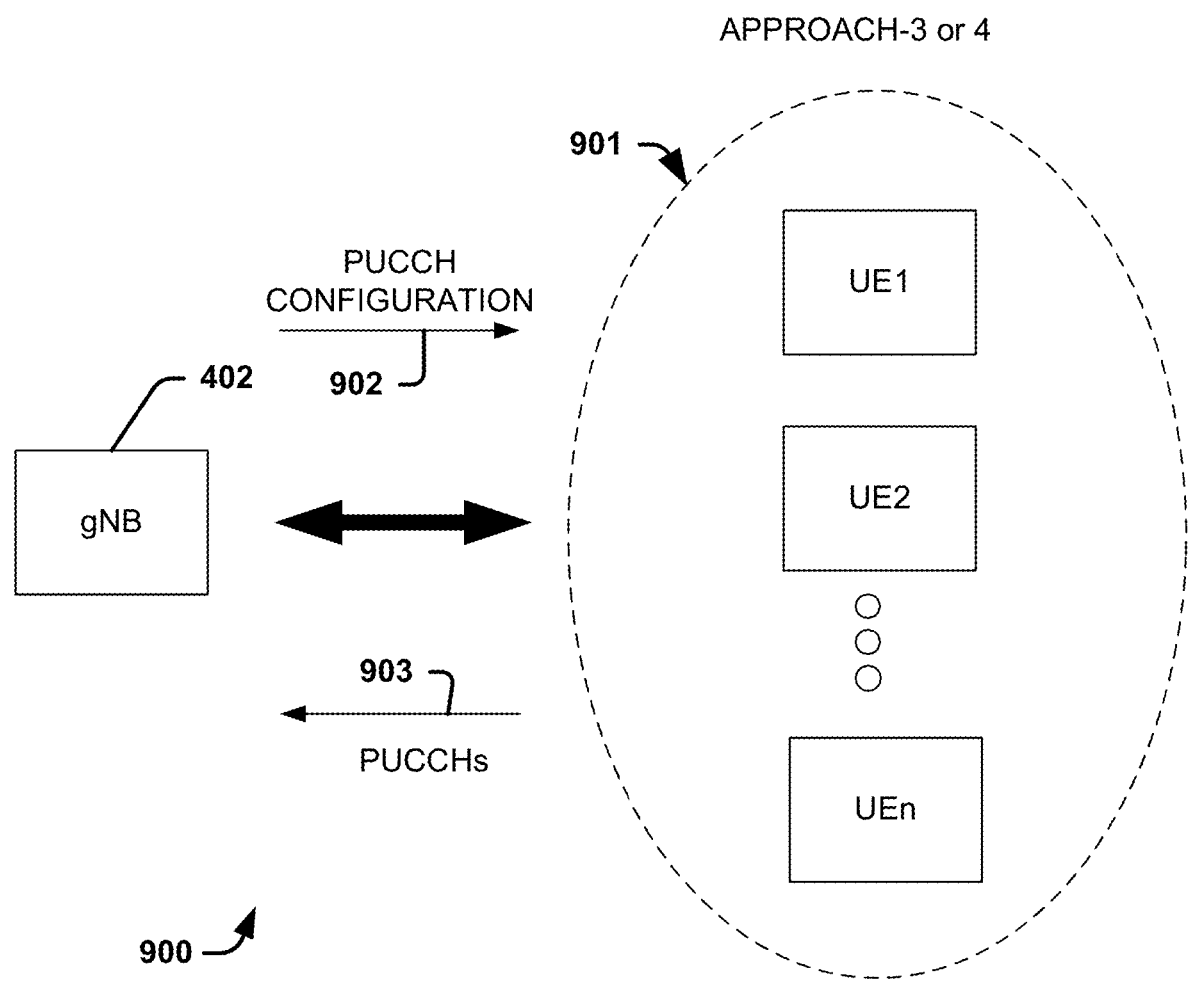
FIG. 9 is a diagram illustrating an architecture of a system for uplink control resource allocation in accordance with one or more embodiments.

FIG. 9 is a diagram illustrating an architecture of a system 900 for uplink control resource allocation in accordance with one or more embodiments. The system 900 is provided as an examples and it is appreciated that suitable variations are contemplated.

The system includes the node 402 and a plurality of network devices 901. The node 402 is shown as a gNB for illustrative purposes. However, the node 402 can be other nodes or access nodes (ANs), such as a base station (BS), eNB, gNB, RAN nodes, UE and the like. The network devices 901 include a plurality of UE devices.

The system 900 facilitates physical uplink control channel (PUCCH) resource allocation.

It is appreciated that in NR, a combination of explicit indication using 2-bit ARI and implicit mapping for PUCCH resource allocation can be used. In particular, when more than 4 PUCCH resources are configured within a resource set, a subset within a resource set can be indicated by 2-bit ARI. Implicit mapping can be used to select one of the PUCCH resources within the indicated subset.

It is noted that using explicit indication and implicit mapping for PUCCH resources can reduce PUCCH resource collision probability within a cell. Additionally, using explicit indication and implicit mapping can mitigate signaling overhead.

It is appreciated that up to 8 resources can be configured within a resource set, which indicates that up to 2 resources can be included in a resource subset, which is indicated by 2-bit ARI. Implicit mapping for this example provides a binary indicator to select which PUCCH resource is used within a resource subset.

One approach (mapping-1) for implicit mapping is to utilize a starting CCE index of a scheduling PDCCH and an associated aggregation level to indicate the PUCCH resource, which is given by $$r = \mod\left(\frac{n_{CCE}}{AL}, N_i^{PUCCH}\right) \quad (1)$$

Where $n_{CCE}$ is the starting CCE of the scheduling PDCCH, AL is the aggregation level, $N_i^{PUCCH}$ is the number of PUCCH resource within ith resource subset, which is indicated by 2-bit ARI.

This approach can reduce the resource collision probability within a cell, especially considering the case when the multiple UEs 901 are configured with same PUCCH resource set 902.

However, the above approach and equation for mapping can still have resource collision probability within a cell. For example, when multiple user-multiple input multiple output (MU-MIMO) is used for transmission of PDCCH for multiple UEs, or when two UEs in UE specific CORESETs have the same starting CCE index for the scheduling PDCCH the above approach can permit resource collisions.

Another approach (mapping-2) of implicit mapping of PUCCH resources within a resource subset can be used to further reduce the PUCCH resource collision rate.

One of the UEs configures or determines an offset in addition to the starting index. The offset can be included in the equation (2). It is noted that the UE is configured with a configurable ID for DM-RS sequence initialization for each CORESET configured by UE-specific RRC signaling. In this example, this configurable ID may be included in the equation above, $$r = \mod\left(\frac{n_{CCE}}{AL} + n_{ID}, N_i^{PUCCH}\right) \quad (2)$$

Where $n_{ID}$ is the configurable ID for PDCCH DM-RS sequence initialization.

In another approach (mapping-3), a UE ID (e.g., in a form of Cell Radio Network Temporary Identifier (C-RNTI)) can be included in the above equation for implicit mapping, i.e., $$r = \mod\left(\frac{n_{CCE}}{AL} + n_{RNTI}, N_i^{PUCCH}\right) \quad (3)$$

Where $n_{RNTI}$ is the C-RNTI.

In another example, HARQ-ACK responses utilize multiplexing. The HARQ-ACK feedback for a PDSCH transmission from multiple slots and multiple CCs can be multiplexed and conveyed in a PUCCH. In this example, the UE determines which scheduling PDCCH and corresponding starting CCI index are used to derive the PUCCH resource from a resource set.

The UE can derive the PUCCH resource from the last received PDCCH with highest CC and/or CORESET ID and/or BWP ID. Thus, the priority order for PDCCH monitoring when deriving PUCCH resource is defined as Time index>CC index>BWP index>CORESET index.

In another example, the priority order for PDCCH monitoring when deriving PUCCH resource is defined as CC index>BWP index>CORESET index>time index.

Yet in another example, the UE can derive the PUCCH resource from a set of PDCCH monitoring occasions within monitoring window based on a predefined rule or configured by higher layers. For example, the UE is configured with a set of PDCCH monitoring occasions for PUCCH resource derivation, while the UE derives the PUCCH resource based on the last received PDCCH with highest CC/BWP/CORESET ID within the configured set of PDCCH monitoring occasions.

It is appreciated that suitable variations of the approaches and other suitable approaches for implicit mapping of PUCCH resources are contemplated.

Figure 10:
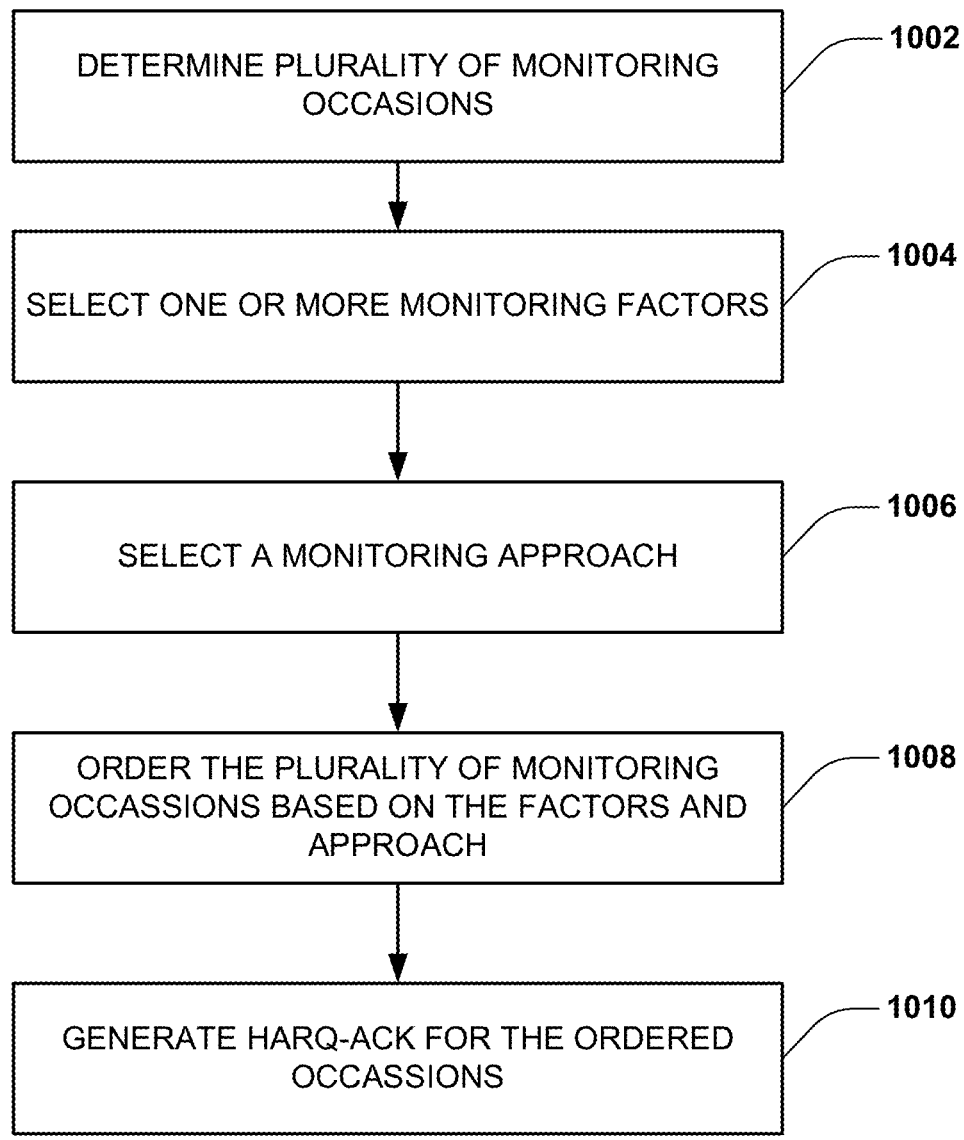
FIG. 10 is a flow diagram illustrating a method of ordering monitoring occasions for one or more CORESETs in accordance with one or more embodiments.

FIG. 10 is a flow diagram illustrating a method 1000 of ordering monitoring occasions for one or more CORESETs in accordance with one or more embodiments. The method 1000 can be performed with the system 400 and can generate HARQ-ACK monitoring occasion orderings.

The system 400 and the method 600 can be referenced for additional description of the method 1000.

Examples of generated orderings are shown in FIG. 7 and FIG. 8.

The method 1000 begins at block 1002, where a plurality of monitoring occasions are determined or identified for a set of CORESETs by a UE.

One or more monitoring factors are selected at block 1004. The monitoring factors can include time index, CC index, BWP index, CORESET index and the like.

A monitoring approach for the monitoring factors is selected at block 1006. The monitoring approach indicates levels of ordering, such as approach-1, approach-2, and the like.

The UE orders or bit orders the plurality of monitoring occasions based on the monitoring factors and the monitoring approach at block 1008. In one example, the plurality of monitoring occasions are ordered starting at zero (0) to a limit (M−1).

The UE generates a HARQ-ACK or HARQ feedback including the ordered plurality of monitoring occasions at block 1010. The HARQ-ACK can be generated as part of a PUCCH and transmitted to a gNB.

It is appreciated that suitable variations of the method 1000 are contemplated, including performing additional blocks, omitting blocks and the like.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus configured to be employed within a user equipment (UE) device. The apparatus comprises baseband circuitry which includes a radio frequency (RF) interface and one or more processors. The one or more processors are configured to identify a plurality of monitoring occasions for a set of flexible control resource sets (CORESETs); determine bit ordering for the plurality of monitoring occasions based on one or more monitoring factors; and generate hybrid automatic repeat request-acknowledge (HARQ-ACK) bits based on the determined ordering for the PUCCH.

Example 2 includes the subject matter of Example 1, including or omitting optional elements, wherein the first set is associated with one or more bandwidth parts (BWPs).

Example 3 includes the subject matter of any of Examples 1-2, including or omitting optional elements, wherein the set is associated with a plurality of component carriers (CCs).

Example 4 includes the subject matter of any of Examples 1-3, including or omitting optional elements, wherein the plurality of monitoring occasions are physical downlink control channel (PDCCH) monitoring occasions.

Example 5 includes the subject matter of any of Examples 1-4, including or omitting optional elements, wherein the RF interface is configured to receive a HARQ downlink transmission from the gNB.

Example 6 includes the subject matter of any of Examples 1-5, including or omitting optional elements, wherein the plurality of monitoring occasions are for PDCCH with a downlink control information (DCI) format with a cyclical redundancy code (CRC).

Example 7 includes the subject matter of any of Examples 1-6, including or omitting optional elements, wherein the CRC is scrambled by a cell-radio network temporary identifier (C-RNTI) used for a downlink assignment.

Example 8 includes the subject matter of any of Examples 1-7, including or omitting optional elements, wherein the one or more monitoring factors include one or more of a time index, a CC index, an active BWP index and a CORESET index.

Example 9 includes the subject matter of any of Examples 1-8, including or omitting optional elements, wherein the one or more monitoring factors are prioritized in order by the time index, the CC index, the active BWP index and the CORESET index.

Example 10 includes the subject matter of any of Examples 1-9, including or omitting optional elements, wherein the determined bit ordering is based on a predetermined HARQ-ACK codebook.

Example 11 includes the subject matter of any of Examples 1-10, including or omitting optional elements, wherein the determined bit ordering is based on a semi static type-1 HARQ-ACK codebook.

Example 12 includes the subject matter of any of Examples 1-11, including or omitting optional elements, where the one or more processors are configured to derive PUCCH resources from a resource subset based on a starting control channel element (CCE) index and an associated aggregation level.

Example 13 includes the subject matter of any of Examples 1-12, including or omitting optional elements, wherein the one or more processors are configured to generate a PUCCH resource from the plurality of monitoring occasions within a monitoring window based on a predefined rule or configured by higher layers.

Example 14 is an apparatus for or configured to be employed within a next Generation nodeB (gNB). The apparatus comprises baseband circuitry which includes a radio frequency (RF) interface and one or more processors. The RF interface is configured to identify a HARQ-ACK bits associated with a set of control resource sets (CORESETs) in the HARQ-ACK feedback; and obtain the set of CORESETs.

Example 15 includes the subject matter of Example 14, including or omitting optional elements, wherein the one or more processors are configured to identify PUCCH resources in the HARQ-ACK feedback.

Example 16 includes the subject matter of any of Examples 14-15, including or omitting optional elements, wherein the one or more processors are configured to generate a HARQ and provide the HARQ to the RF interface for transmission to a user equipment (UE) device.

Example 17 is one or more computer-readable media having instructions. The instructions, when executed, cause a user equipment (UE) device to: determine a plurality of monitoring occasions for a set of control resource sets (CORESETs) for a physical downlink control channel (PDCCH); select one or more monitoring parameters for the plurality of monitoring occasions and the set of CORESETs; and select an ordering approach for the plurality of monitoring occasions and the set of CORESETs.

Example 18 includes the subject matter of Example 17, including or omitting optional elements, wherein the instructions, when executed, further cause the UE device to generate hybrid automatic repeat request (HARQ) feedback including the plurality of monitoring occasions.

Example 19 includes the subject matter of any of Examples 17-18, including or omitting optional elements, wherein the instructions, when executed, further cause the UE device to order the plurality of monitoring occasions based on the determined bit ordering.

Example 20 includes the subject matter of any of Examples 17-19, including or omitting optional elements, wherein the instructions, when executed, further cause the UE device to order the plurality of monitoring occasions based on the determined bit ordering.

Example 21 is an apparatus configured to be employed within a user equipment (UE) device. The apparatus comprises baseband circuitry which includes a radio frequency (RF) interface and one or more processors. The one or more processors are configured to identify a plurality of monitoring occasions for a set of flexible control resource sets (CORESET); determine bit ordering for the plurality of monitoring occasions; generate hybrid automatic repeat request (HARQ) feedback based on the received downlink transmission; and incorporate the ordered plurality of monitoring occasions into the HARQ feedback.

Example 22 includes the subject matter of Example 21, including or omitting optional elements, wherein the first set is associated with one or more bandwidth parts (BWPs).

Example 23 includes the subject matter of any of Examples 21-22, including or omitting optional elements, wherein the UE device is configured with HARQ-ACK spatial bundling without a code block group (CBG).

Example 24 includes the subject matter of any of Examples 21-23, including or omitting optional elements, wherein the one or more processors are configured to generate one HARQ-ACK for a PDCCH monitoring occasion m.

Example 25 includes the subject matter of any of Examples 21-24, including or omitting optional elements, wherein the one or more processors are configured to generate one a plurality of HARQ-ACK with each transport block (TB) or one code block group (CBG).

Example 26 is an apparatus configured to be employed within a user equipment (UE) device. The apparatus comprises baseband circuitry which includes a radio frequency (RF) interface and one or more processors. The one or more processors are configured to generate a mapping to select a PUCCH resource within a subset of a resource set to mitigate collision probability within a cell.

Example 27 includes the subject matter of Example 26, including or omitting optional elements, wherein the resource set includes 8 resources and the resource subset includes up to 2 resources.

Example 28 includes the subject matter of any of Examples 26-27, including or omitting optional elements, wherein the mapping is an implicit mapping and uses a starting CCE index of a scheduling PDCCH and an associated aggregation level to indicate the PUCCH resource, which is given by $$r = \mod\left(\frac{n_{CCE}}{AL}, N_i^{PUCCH}\right);$$

wherein $n_{CCE}$ is the starting CCE of the scheduling PDCCH, AL is the aggregation level, $N_i^{PUCCH}$ is the number of PUCCH resource within ith resource subset, which is indicated by 2-bit ARI.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An apparatus for a user equipment (UE) device, comprising baseband circuitry having:
   a radio frequency (RF) interface configured to provide a physical uplink control channel (PUCCH) for transmission to a next Generation NodeB (gNB);
   one or more processors configured to:
      identify a plurality of monitoring occasions for a set of flexible control resource sets (CORESETs);
      determine bit ordering for the plurality of monitoring occasions based on one or more monitoring factors, wherein the one or more monitoring factors include two or more of a time index, a CC index, an active BWP index and a CORESET index, and wherein the two or more monitoring factors are prioritized in order by the time index, the CC index, the active BWP index and the CORESET index; and
      generate hybrid automatic repeat request-acknowledge (HARQ-ACK) bits based on the determined bit ordering for the PUCCH.

2. The apparatus of claim 1, wherein the first set is associated with one or more bandwidth parts (BWPs).

3. The apparatus of claim 1, wherein the set is associated with a plurality of component carriers (CCs).

4. The apparatus of claim 1, wherein the plurality of monitoring occasions are physical downlink control channel (PDCCH) monitoring occasions.

5. The apparatus of claim 1, wherein the RF interface is configured to receive a HARQ downlink transmission from the gNB.

6. The apparatus of claim 1, wherein the plurality of monitoring occasions are for PDCCH with a downlink control information (DCI) format with a cyclical redundancy code (CRC).

7. The apparatus of claim 6, wherein the CRC is scrambled by a cell-radio network temporary identifier (C-RNTI) used for a downlink assignment.

8. The apparatus of claim 1, where the one or more processors are configured to derive PUCCH resources from a resource subset based on a starting control channel element (CCE) index and an associated aggregation level.

9. The apparatus of claim 1, wherein the one or more processors are configured to generate a PUCCH resource from the plurality of monitoring occasions within a monitoring window based on a predefined rule or configured by higher layers.

10. One or more non-transitory computer-readable media having instructions that, when executed by a processor, cause a user equipment (UE) device to:
   determine a plurality of monitoring occasions for a set of control resource sets (CORESETs) for a physical downlink control channel (PDCCH);
   select one or more monitoring parameters for the plurality of monitoring occasions and the set of CORESETs; and
   select an ordering approach for the plurality of monitoring occasions and the set of CORESETs based on the selected one or more monitoring parameters,
   wherein the one or more monitoring parameters include two or more of a time index, a CC index, an active BWP index and a CORESET index, and wherein the two or more monitoring parameters are prioritized in order by the time index, the CC index, the active BWP index and the CORESET index.

11. The non-transitory computer-readable media of claim 10, wherein the instructions, when executed by the processor, further cause the UE device to generate hybrid automatic repeat request (HARQ) feedback including the plurality of monitoring occasions.

12. The non-transitory computer-readable media of claim 10, wherein the set of CORESETs is associated with a plurality of component carriers (CCs) or a plurality of bandwidth parts (BWPs).

* * * * *